United States Patent
Oda et al.

(10) Patent No.: US 11,486,454 B2
(45) Date of Patent: Nov. 1, 2022

(54) DRIVING FORCE TRANSMISSION CONTROL DEVICE AND CONTROL METHOD FOR DRIVING FORCE TRANSMISSION CONTROL DEVICE

(71) Applicant: JTEKT CORPORATION, Kariya (JP)

(72) Inventors: Ichiro Oda, Toyokawa (JP); Go Nagayama, Toyama (JP); Tomonori Ono, Yatomi (JP); Takashi Kouzai, Kariya (JP)

(73) Assignee: JTEKT CORPORATION, Kariya (JP)

( * ) Notice: Subject to any disclaimer, the term of this patent is extended or adjusted under 35 U.S.C. 154(b) by 106 days.

(21) Appl. No.: 17/149,809

(22) Filed: Jan. 15, 2021

(65) Prior Publication Data

US 2021/0222741 A1   Jul. 22, 2021

(30) Foreign Application Priority Data

Jan. 20, 2020  (JP) .............................. JP2020-006884

(51) Int. Cl.
  *F16D 27/115*   (2006.01)
  *F16D 48/06*    (2006.01)
  *F16D 27/00*    (2006.01)

(52) U.S. Cl.
  CPC .......... *F16D 27/115* (2013.01); *F16D 48/064* (2013.01); *F16D 2027/002* (2013.01); *F16D 2500/10412* (2013.01); *F16D 2500/30803* (2013.01); *F16D 2500/70418* (2013.01); *F16D 2500/70615* (2013.01)

(58) Field of Classification Search
  CPC .. F16D 27/115; F16D 2027/002; F16D 48/06; F16D 2500/70418; F16D 2500/3022; F16D 2500/7061; F16D 2500/70615; F16D 2500/70626
  See application file for complete search history.

(56) References Cited

U.S. PATENT DOCUMENTS

2011/0246038 A1* 10/2011 Trutschel .............. F16D 48/066
                                                           701/68
2014/0214294 A1*  7/2014 Mori ....................... F16D 11/10
                                                           701/60

(Continued)

FOREIGN PATENT DOCUMENTS

JP   2007-064251 A   3/2007
JP   2019-044926 A   3/2019

*Primary Examiner* — David R Morris
*Assistant Examiner* — Lori Wu
(74) *Attorney, Agent, or Firm* — Oblon, McClelland, Maier & Neustadt, L.L.P.

(57) ABSTRACT

A driving force transmission control device includes a driving force transmission device configured to press a friction clutch by an actuator and a controller configured to control the driving force transmission device. The controller calculates a torque command value indicating a driving force to be transmitted from a rotating member on an input side to a rotating member on an output side based on information of a vehicle. The controller sets an electric current command value according to a magnitude and an amount of time change of the torque command value. The electric current command value is a target value of an electric current. The controller performs electric current feedback control such that an electric current corresponding to the calculated electric current command value is supplied to the actuator.

5 Claims, 9 Drawing Sheets (56) References Cited

U.S. PATENT DOCUMENTS

2015/0136559 A1\* 5/2015 Brumberger .......... F16D 48/064
  192/84.9
2019/0072137 A1\* 3/2019 Kato ....................... F16D 13/52
2019/0072142 A1 3/2019 Kato et al.

\* cited by examiner

DRIVING FORCE TRANSMISSION CONTROL DEVICE AND CONTROL METHOD FOR DRIVING FORCE TRANSMISSION CONTROL DEVICE

CROSS-REFERENCE TO RELATED APPLICATION

This application claims priority to Japanese Patent Application No. 2020-006884 filed on Jan. 20, 2020, incorporated herein by reference in its entirety.

BACKGROUND

1. Technical Field

The disclosure relates to a driving force transmission control device including a driving force transmission device having a friction clutch in which frictional sliding of a clutch plate is lubricated by lubricating oil and a control device, and a control method for a driving force transmission control device.

2. Description of Related Art

Four-wheel drive vehicles, which includes main drive wheels and auxiliary drive wheels and can switch between a two-wheel drive state in which a driving force of a drive source is transmitted merely to the main drive wheels and a four-wheel drive state in which the driving force of the drive source is transmitted to the main drive wheels and the auxiliary drive wheels, may include a driving force transmission device capable of adjusting the driving force transmitted to the auxiliary drive wheels (see, for example, Japanese Unexamined Patent Application Publication No. 2007-64251 (JP 2007-64251 A)).

The driving force transmission device described in JP 2007-64251 A includes an outer case and an inner shaft capable of rotating relative to each other on the common axis, a main clutch including a plurality of inner clutch plates and a plurality of outer clutch plates disposed between the outer case and the inner shaft, a cam mechanism generating a thrust force that presses the main clutch by relative rotation of a pair of cam members, and a pilot clutch transmitting a rotational force to one of the cam members to rotate relative to the other one of the cam members. The pilot clutch has an electromagnetic coil to which an electric current is supplied from a control device, a plurality of clutch plates, and an armature disposed at a position where the clutch plates fit in between the armature and the electromagnetic coil.

When the electric current is supplied to the electromagnetic coil from the control device, the rotational force transmitted by the pilot clutch causes the cam members of the cam mechanism to rotate relative to each other, and the thrust force generated by the relative rotation causes the main clutch to be pressed, resulting in the inner clutch plates coming into frictional contact into the outer clutch plates. Then, the driving force is transmitted from the outer case to the inner shaft through the main clutch. In the main clutch and the pilot clutch, the frictional sliding between the clutch plates is lubricated by the lubricating oil.

The control device stores the I-T characteristic indicating the relationship between the electric current supplied to the electromagnetic coil and the magnitude of the torque output from the driving force transmission device, and adjusts the electric current supplied to the electromagnetic coil based on the I-T characteristic such that the driving force to be needed is transmitted to the auxiliary drive wheels.

In addition, the applicant has devised a driving force transmission control device capable of enhancing responsiveness of a transmission torque by the main clutch, in which, when the amount of increase of the driving force (torque command value) to be transmitted by the main clutch is equal to or more than a threshold value, an electric current command value is corrected to be increased over a correction duration set based on a responsiveness relation value related to the responsiveness of the main clutch (see Japanese Unexamined Patent Application Publication No. 2019-44926 (JP 2019-44926 A)).

SUMMARY

According to JP 2019-44926 A, discharge of lubricating oil interposed between the clutch plates is promoted by correcting the electric current command value to be increased, making it possible to enhance the responsiveness of the transmission torque; however, in some cases, the driving force actually transmitted by the main clutch cannot be accurately adjusted to a magnitude corresponding to the torque command value, depending on the magnitude of the torque command value and the amount of increase.

The disclosure can enhance the controllability of the transmitted torque.

A first aspect of the disclosure relates to a driving force transmission control device including a driving force transmission device and a controller. The driving force transmission control device is configured to press a friction clutch by an actuator configured to generate a pressing force with a supplied electric current, and a controller is configured to control the driving force transmission device. The driving force transmission device is configured to transmit a driving force of a vehicle between a rotating member on an input side and a rotating member on an output side. The controller is configured to calculate a torque command value indicating the driving force to be transmitted from the rotating member on the input side to the rotating member on the output side based on information on the vehicle. The controller is configured to set an electric current command value according to a magnitude and an amount of time change of the torque command value. The electric current command value is a target value of the electric current. The controller is configured to perform electric current feedback control such that an electric current corresponding to the calculated electric current command value is supplied to the actuator.

With the configuration, it is possible to enhance the controllability of the torque transmitted by the driving force transmission device.

A second aspect of the disclosure relates to a control method for a driving force transmission control device. The driving force transmission control device includes a driving force transmission device configured to press a friction clutch by an actuator that generates a pressing force with a supplied electric current to transmit a driving force of a vehicle between a rotating member on an input side and a rotating member on an output side, and a controller configured to control the driving force transmission device. The control method includes calculating, by the controller, a torque command value indicating the driving force to be transmitted from the rotating member on the input side to the rotating member on the output side based on information on the vehicle, setting, by the controller, an electric current command value that is a target value of the electric current according to a magnitude and an amount of time change of the torque command value, and performing, by the controller, electric current feedback control such that an electric current corresponding to the electric current command value is supplied to the actuator.

With the above configuration, it is possible to enhance the controllability of the torque transmitted by the driving force transmission device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

An embodiment of the disclosure will be described with reference to FIGS. 1 to 8. It is to be noted that the embodiment described below is shown as preferred specific examples for implementing the disclosure. Although some part of the embodiment specifically illustrates various technically preferable matters, but, the technical scope of the disclosure is not limited to such specific aspects.

Figure 1:
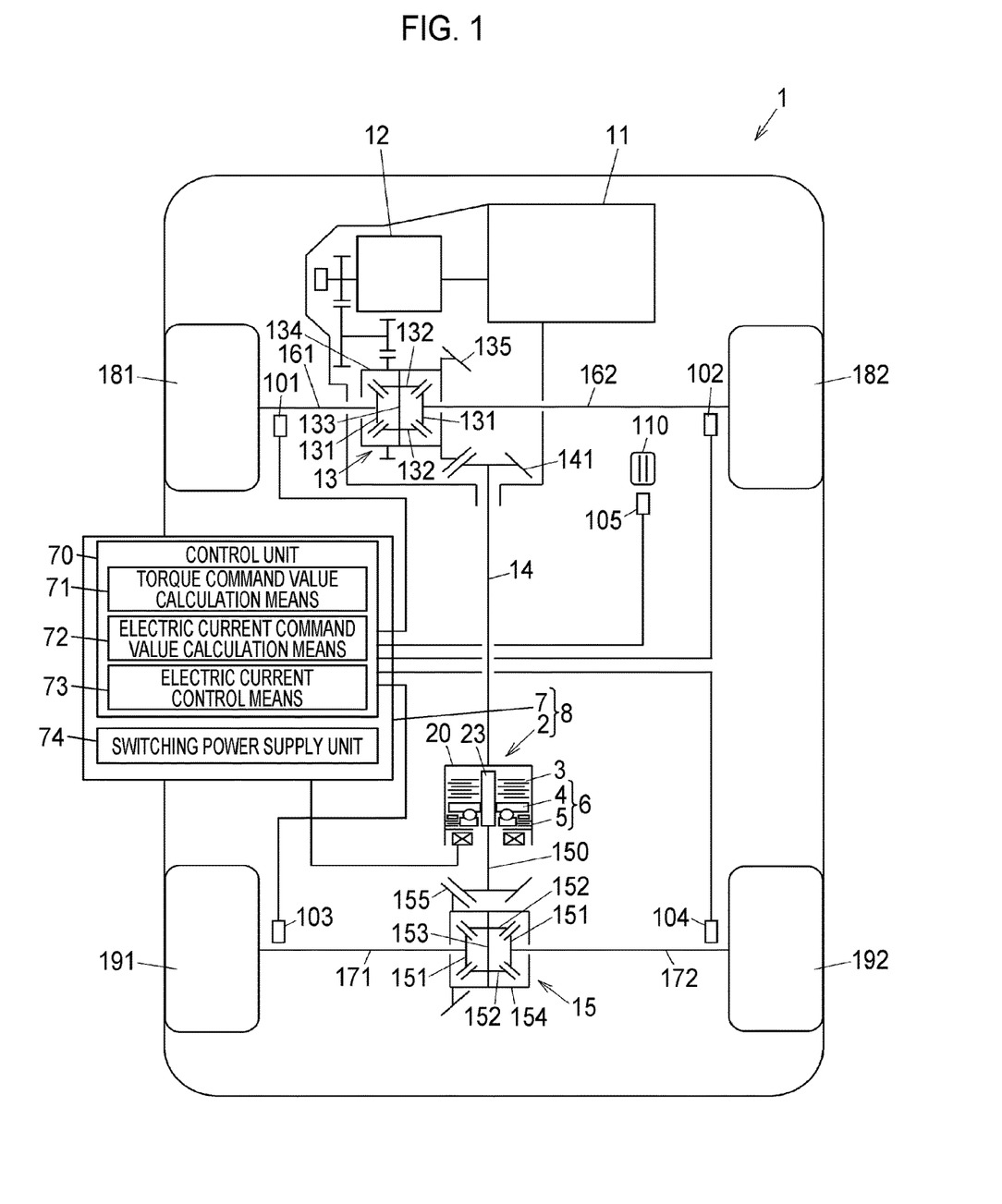
FIG. 1 is a schematic configuration diagram of a schematic configuration example of a four-wheel drive vehicle on which a driving force transmission control device according to an embodiment of the disclosure is mounted.

FIG. 1 is a schematic configuration diagram of a schematic configuration example of a four-wheel drive vehicle on which a driving force transmission control device according to an embodiment of the disclosure is mounted.

As illustrated in FIG. 1, the four-wheel drive vehicle 1 includes an engine 11 as a drive source that generates a driving force in proportion to an operation amount of an accelerator pedal 110 (accelerator operation amount), a transmission 12 that shifts the output of the engine 11, right and left front wheels 182, 181, as main drive wheels, to which the driving force of the engine 11 shifted by the transmission 12 is constantly transmitted, and right and left rear wheels 192, 191 as auxiliary drive wheels, to which the driving force of the engine 11 are transmitted according to s traveling condition of the four-wheel drive vehicle 1. Wheel speed sensors 101, 102, 103, 104 are disposed on the right and left front wheels 182, 181 and the right and left rear wheels 192, 191, respectively.

Further, in the four-wheel drive vehicle 1, a front differential 13, a propeller shaft 14, a rear differential 15, a pinion gear shaft 150 that transmits the driving force to the rear differential 15, drive shafts 161, 162 on the right and left front wheels, drive shafts 171, 172 on the right and left rear wheels, a driving force transmission device 2 disposed between the propeller shaft 14 and the pinion gear shaft 150, and a controller 7 for controlling the driving force transmission device 2 are mounted. The driving force transmission device 2 and the controller 7 constitute the driving force transmission control device 8.

The driving force transmission device 2 transmits, from the propeller shaft 14 to the pinion gear shaft 150, a driving force corresponding to the electric current supplied from the controller 7. The driving force of the engine 11 is transmitted to the right and left rear wheels 192, 191 through the driving force transmission device 2. The controller 7 can obtain wheel speed information indicating rotational speeds of the right and left front wheels 182, 181 and the right and left rear wheels 192, 191 detected by the wheel speed sensors 101, 102, 103, 104, and accelerator operation amount information indicating the amount of operation of the accelerator pedal 110 detected by an accelerator pedal sensor 105, and controls the driving force transmission device 2 by supplying electric current to the driving force transmission device 2. Hereinafter, the electric current output by the controller 7 to control the driving force transmission device 2 is referred to as a control current.

The driving force of the engine 11 is transmitted to the right and left front wheels 182, 181 through the transmission 12, the front differential 13, and the drive shafts 161, 162 at the right and left front wheels. The front differential 13 has a pair of side gears 131 connected to the drive shafts 161, 162 at the right and left front wheels, respectively, such that the drive shafts 161, 162 cannot rotate relative to each other, a pair of pinion gears 132 that meshes with the side gears 131 with their gear axes orthogonal to each other, a pinion gear shaft 133 that supports the pinion gears 132, and a front differential case 134 that accommodates the above mentioned parts.

A ring gear 135 is fixed to the front differential case 134, and the ring gear 135 meshes with a pinion gear 141 provided at the first end of the propeller shaft 14 close to the vehicle front side. A second end of the propeller shaft 14 on the rear side of the vehicle is connected to a housing 20 of the driving force transmission device 2. The driving force transmission device 2 has an inner shaft 23 disposed to be rotatable relative to the housing 20, and the pinion gear shaft 150 is connected to the inner shaft 23 so as not to be rotatable relative to each other. The driving force transmission device 2 will be described in detail later.

The rear differential 15 has a pair of side gears 151 connected to the drive shafts 171, 172 at the right and left rear wheels, respectively, such that the drive shafts 171, 172 cannot rotate relative to each other, a pair of pinion gears 152 that meshes with the side gears 151 with their gear axes orthogonal to each other, a pinion gear shaft 153 that supports the pinion gears 152, a rear differential case 154 that accommodates the above mentioned parts, and a ring gear 155 fixed to the rear differential case 154 and meshing with the pinion gear shaft 150.

Configuration of Driving Force Transmission Device

Figure 2:
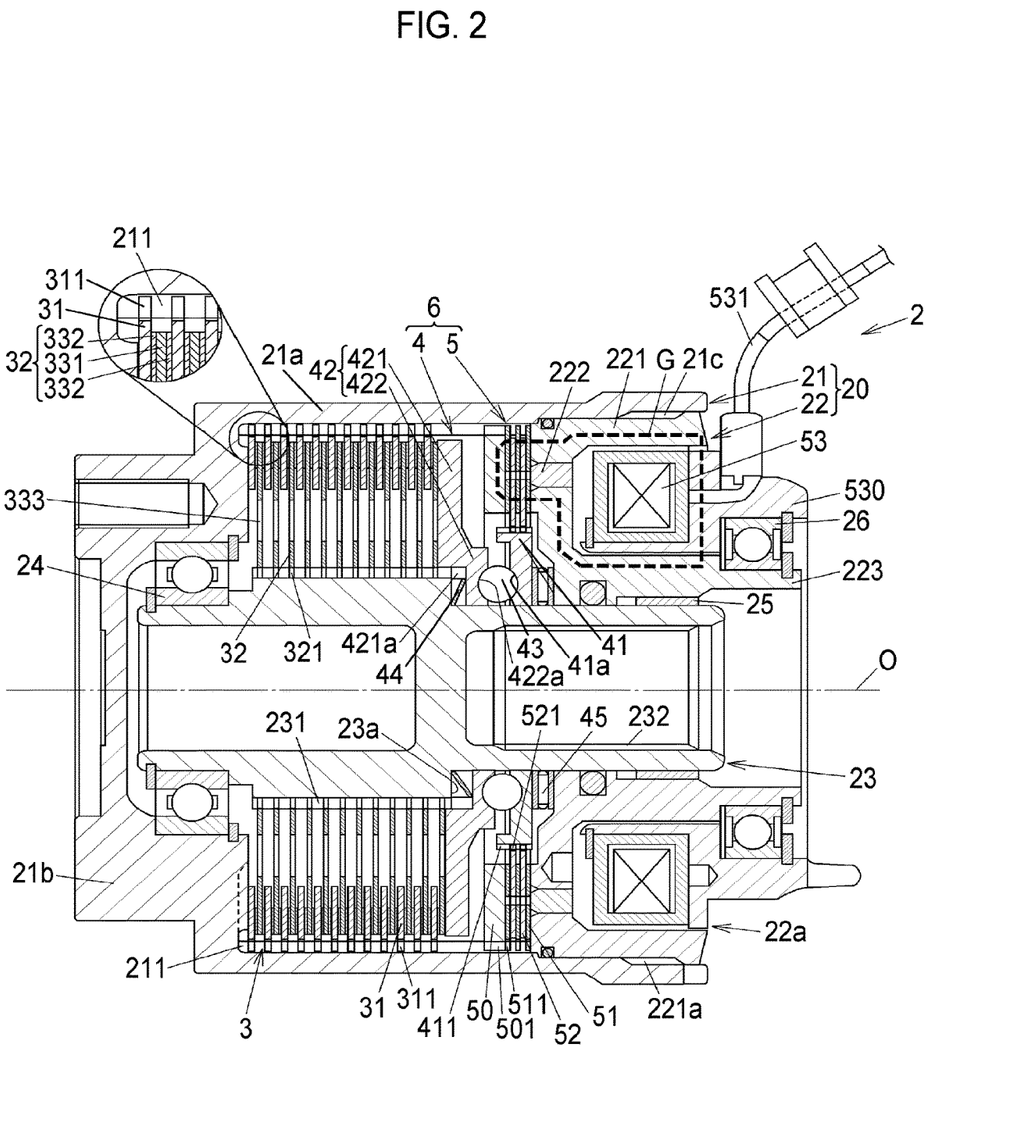
FIG. 2 is a cross-sectional view of a configuration example of the driving force transmission device.

FIG. 2 is a cross-sectional view illustrating a configuration example of the driving force transmission device 2. In FIG. 2, the upper portion of the rotation axis O shows an operating state (torque transmission state) of the driving force transmission device 2, and the lower portion thereof shows a non-operating state (torque non-transmission state) of the driving force transmission device 2. Hereinafter, the direction parallel to the rotation axis O is referred to as an axial direction.

The driving force transmission device 2 is configured to have the housing 20 including a front housing 21 and a rear housing 22, a tubular inner shaft 23 supported to be rotatable relative to the housing 20 on the common axis, a main clutch 3 disposed between the housing 20 and the inner shaft 23, a cam mechanism 4 that generates a thrust force pressing the main clutch 3, and an electromagnetic clutch mechanism 5 that operates the cam mechanism 4 by receiving the supply of electric current from the controller 7. The housing 20 is an example of a rotating member on the input side of the disclosure, and the inner shaft 23 is an example of a rotating member on the output side of the disclosure. The cam mechanism 4 and the electromagnetic clutch mechanism 5 constitute an actuator 6 that generates a pressing force that presses the main clutch 3 in response to the electric current supplied from the controller 7. Lubricating oil (not illustrated) is sealed inside the housing 20.

The front housing 21 has a bottomed cylindrical shape having a cylindrical tubular portion 21a and a bottom portion 21b integrally. A female screw portion 21c is formed on the inner surface of the opening end of the tubular portion 21a. The propeller shaft 14 (see FIG. 1) is connected to the bottom portion 21b of the front housing 21 through, for example, a cross joint. Further, the front housing 21 has a plurality of outer spline protrusions 211 extending in the axial direction on the inner peripheral surface of the tubular portion 21a.

The rear housing 22 includes a first annular member 221 made of magnetic material such as iron, a second annular member 222 made of a non-magnetic material such as austenitic stainless steel and integrally bonded to the inner peripheral side of and the first annular member 221 by welding or the like, and a third annular member 223 made of a magnetic material such as iron and integrally bonded to the inner peripheral side of the second annular member 222 by welding or the like. An annular accommodation space 22a for accommodating the electromagnetic coil 53 is formed between the first annular member 221 and the third annular member 223. Further, a male screw portion 221a to be screwed into the female screw portion 21c of the front housing 21 is formed on the outer peripheral surface of the first annular member 221.

The inner shaft 23 is supported on the inner peripheral side of the housing 20 by a ball bearing 24 and a needle roller bearing 25. The inner shaft 23 has a plurality of inner spline protrusions 231 extending in the axial direction on the outer peripheral surface. Further, on the inner surface of one end portion of the inner shaft 23, a spline fitting portion 232 is formed in which one end portion of the pinion gear shaft 150 (see FIG. 1) is fitted so as not to be rotatable relative to each other.

The main clutch 3 corresponds to the friction clutch of the disclosure, and includes a plurality of main outer clutch plates 31 and a plurality of main inner clutch plates 32, which are alternately disposed in the axial direction. The main outer clutch plates 31 rotate together with the front housing 21, and the main inner clutch plates 32 rotate together with the inner shaft 23. The frictional sliding between the main outer clutch plates 31 and the main inner clutch plates 32 is lubricated by lubricating oil (not illustrated) sealed between the housing 20 and the inner shaft 23, which suppresses wear and seizure.

The main outer clutch plate 31 has an annular plate shape and is made of metal, and has a plurality of engaging protrusions 311 that engage with the outer spline protrusions 211 of the front housing 21 at the outer peripheral end portion. By the engaging protrusions 311 engaging with the outer spline protrusions 211, the main outer clutch plates 31 can be restricted from rotating relative to the front housing 21 and be moved in the axial direction with respect to the front housing 21. Further, the main outer clutch plate 31 has an oil groove (not illustrated) for flowing lubricating oil formed on the surface facing the main inner clutch plate 32.

The main inner clutch plate 32 has a plurality of engaging protrusions 321 that engage with the inner spline protrusions 231 of the inner shaft 23 at the inner peripheral end portion. By the engaging protrusions 321 engaging with the inner spline protrusions 231, the main inner clutch plate 32 can be restricted from rotating relative to the inner shaft 23 and be moved in the axial direction with respect to the inner shaft 23.

The main inner clutch plate 32 has an annular plate-shaped base material 331 made of metal and friction materials 332 attached to both side surfaces of the base material 331. In the base material 331, a plurality of oil holes 333 is formed for flowing lubricating oil inside the portion to which the friction materials 332 are attached. The friction material 332 is made of, for example, a paper friction material or a non-woven fabric, and is attached to a portion facing the main outer clutch plate 31.

A cam mechanism 4 is configured to have a pilot cam 41 that receives the rotational force of the housing 20 through the electromagnetic clutch mechanism 5, a main cam 42 that presses the main clutch 3 in the axial direction, and a plurality of spherical cam balls 43 disposed between the pilot cam 41 and the main cam 42.

The main cam 42 integrally has a ring plate-shaped pressing portion 421 as a pressing member pressing the main clutch 3 that presses the main clutch 3 by contacting the main inner clutch plate 32 at one end of the main clutch 3, and a cam portion 422 provided on the inner peripheral side of the main cam 42 compared to the pressing portion 421. The main cam 42 is restricted from rotating relative to the inner shaft 23 by a spline engaging portion 421a formed at the inner peripheral end portion of the pressing portion 421 engaging with the inner spline protrusion 231 of the inner shaft 23. Further, the main cam 42 is urged to be axially separated from the main clutch 3 by a disc spring 44 as a return spring that is disposed between the main cam 42 and a stepped surface 23a formed on the inner shaft 23.

The pilot cam 41 has a spline protrusion 411 at the outer peripheral end portion, and the spline protrusion 411 receives, from the electromagnetic clutch mechanism 5, a rotational force for rotating relative to the main cam 42. A thrust needle roller bearing 45 is disposed between the pilot cam 41 and the third annular member 223 of the rear housing 22. A plurality of cam grooves 41a, 422a of which axial depths change along the circumferential direction are formed on the facing surfaces of the pilot cam 41 and the cam portion 422 of the main cam 42, respectively. The cam ball 43 is disposed between the cam groove 41a of the pilot cam 41 and the cam groove 422a of the main cam 42.

The cam mechanism 4 generates a pressing force for pressing the main clutch 3 by rotating the pilot cam 41 relative to the main cam 42. The main outer clutch plate 31 and the main inner clutch plate 32 are brought into frictional contact with each other by the main clutch 3 receiving the pressing force from the cam mechanism 4, and the driving force is transmitted by the frictional force generated between the main outer clutch plates 31 and the main inner clutch plates 32.

The electromagnetic clutch mechanism 5 is configured to have an armature 50, a plurality of pilot outer clutch plates 51, a plurality of pilot inner clutch plates 52, and an electromagnetic coil 53. The electromagnetic coil 53 is held by an annular yoke 530 made of a magnetic material, and is accommodated in the accommodation space 22a of the rear housing 22. The yoke 530 is supported by a ball bearing 26 on the third annular member 223 of the rear housing 22, and the outer peripheral surface of the yoke 530 faces the inner peripheral surface of the first annular member 221. Further, the inner peripheral surface of the yoke 530 faces the outer peripheral surface of the third annular member 223. The control current from the controller 7 is supplied to the electromagnetic coil 53 through an electric wire 531 as an exciting current.

The pilot outer clutch plates 51 and the pilot inner clutch plates 52 are alternately disposed in the axial direction between the armature 50 and the rear housing 22. The pilot outer clutch plate 51 and the pilot inner clutch plate 52 have a plurality of arc-shaped slits formed for suppressing a short circuit of magnetic flux generated by energization of the electromagnetic coil 53.

The pilot outer clutch plate 51 has a plurality of engaging protrusions 511 that engage with the outer spline protrusions 211 of the front housing 21 at the outer peripheral end portion. The pilot inner clutch plate 52 has a plurality of engaging protrusions 521 that engage with the spline protrusions 411 of the pilot cam 41 at the inner peripheral end portion. The frictional sliding between the pilot outer clutch plate 51 and the pilot inner clutch plate 52 is also lubricated by the lubricating oil in the same manner as the main clutch 3.

The armature 50 is an annular member made of a magnetic material such as iron, and has a plurality of engaging protrusions 501 that engage with the outer spline protrusions 211 of the front housing 21 formed on the outer peripheral portion thereof. In this way, the armature 50 is movable in the axial direction with respect to the front housing 21, and the rotation relative to the front housing 21 is restricted.

In the driving force transmission device 2 configured as described above, magnetic flux is generated in a magnetic path G by the control current supplied to the electromagnetic coil 53 and the armature 50 is attracted toward the rear housing 22 by the magnetic force, and thus the pilot outer clutch plates 51 and the pilot inner clutch plates 52 come into frictional contact with each other. As a result, the rotational force corresponding to the control current is transmitted to the pilot cam 41 and the pilot cam 41 rotates relative to the main cam 42, making the cam balls 43 rolling in the cam grooves 41a, 422a. With the rolling of the cam balls 43, a thrust force for pressing the main clutch 3 is generated on the main cam 42, and a frictional force is generated between the main outer clutch plates 31 and the main inner clutch plates 32. Then, the driving force is transmitted from the propeller shaft 14 to the pinion gear shaft 150 by the frictional force.

Configuration of Control Device

As illustrated in FIG. 1, the controller 7 includes a control unit 70 having a central processing unit (CPU) (calculation processing device) and a storage element and a switching power supply unit 74 that switches a voltage of a direct current (DC) power supply such as a battery and supplies electric current to the electromagnetic coil 53 of the driving force transmission device 2. The switching power supply unit 74 has a switching element such as a transistor, switches a direct current (DC) voltage based on a pulse width modulation (PWM) signal output from the control unit 70, and generates a control current to be supplied to the electromagnetic coil 53.

In the control unit 70, the CPU executes a program stored in the non-volatile storage element to function as torque command value calculation means 71, electric current command value calculation means 72, and electric current control means 73. The torque command value calculation means 71 calculates a torque command value indicating the driving force to be transmitted from the housing 20 to the inner shaft 23 based on the information on the vehicle. The electric current command value calculation means 72 sets an electric current command value, which is a target value of the control current supplied to the electromagnetic coil 53, according to the torque command value. The electric current control means 73 performs electric current feedback control such that the electric current corresponding to the electric current command value calculated by the electric current command value calculation means 72 is supplied to the electromagnetic coil 53.

Further, when the torque command value suddenly rises, the electric current command value calculation means 72 sets the electric current command value according to the magnitude of the torque command value and the amount of time change of the torque command value. This is done to compensate for the decrease in responsiveness of the main clutch 3 due to the lubricating oil interposed between the main outer clutch plates 31 and the main inner clutch plates 32 by increasing the electric current command value, when the torque command value suddenly rises.

Figure 3:
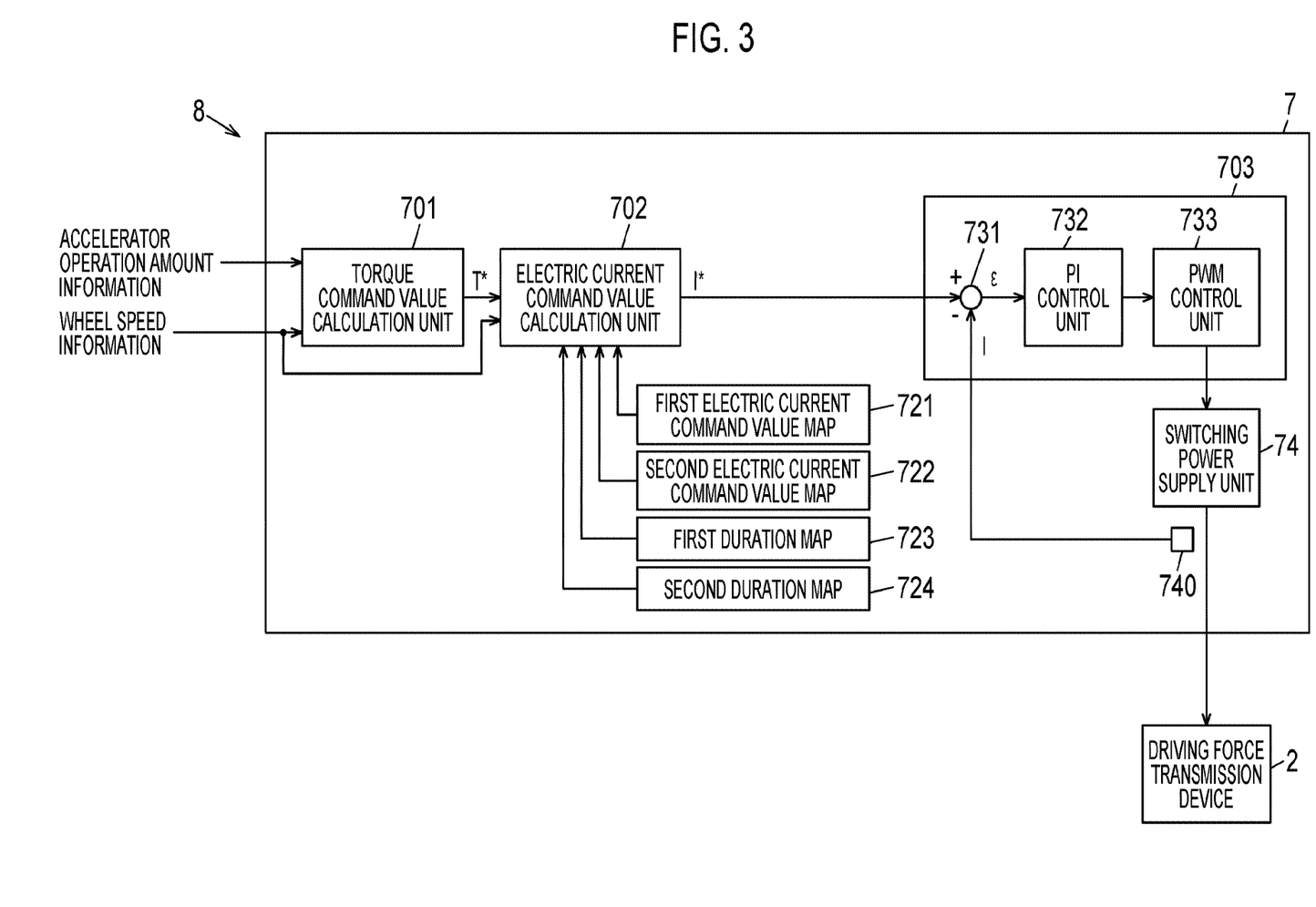
FIG. 3 is a control block diagram of an example of a control configuration of a control device.

FIG. 3 is a control block diagram of an example of a control configuration of the controller 7. In the control block diagram, a torque command value calculation unit 701, the electric current command value calculation unit 702, and the electric current control unit 703 are constructed by the torque command value calculation means 71, the electric current command value calculation means 72, and the electric current control means 73, respectively.

The torque command value calculation unit 701 calculates a torque command value T* based on the wheel speed information of the right and left front wheels 182, 181 and the right and left rear wheels 192, 191 detected by the wheel speed sensors 101, 102, 103, 104, and accelerator operation amount information detected by the accelerator pedal sensor 105. The wheel speed information and the accelerator operation amount information are examples of the information on the vehicle. The torque command value calculation unit 701 sets the torque command value T* to be larger as the accelerator operation amount is larger and as a front and rear wheel differential rotational speed, which is the difference between the average rotational speed of the right and left front wheels 182, 181 and the average rotational speed of the right and left rear wheels 192, 191, is higher. The information on the vehicle is not limited to wheel speed information and accelerator operation amount information, and detection values of various in-vehicle sensors such as detection values of yaw rate sensors and steering angle sensors can be used.

The electric current command value calculation unit 702 refers to a first electric current command value map 721, a second electric current command value map 722, a first duration map 723, and a second duration map 724, and calculates an electric current command value I* corresponding to the torque command value T*. The calculation method for the electric current command value I* will be described later.

The electric current control unit 703 includes a deviation calculation unit 731, a proportional-integral (PI) control unit 732, and a PWM control unit 733. The deviation calculation unit 731 calculates the deviation ε between the actual electric current value I, which is the detected value of the control current detected by an electric current sensor 740, and a command electric current value I*. The PI control unit 732 performs the electric current feedback control by performing a PI calculation on the deviation ε calculated by the deviation calculation unit 731 and calculating a duty ratio of the PWM signal output to the switching power supply unit 74 such that the actual electric current value I approaches the command electric current value I*. The PWM control unit 733 generates a PWM signal for turning on or off the switching element of the switching power supply unit 74 based on the duty ratio calculated by the PI control unit 732, and outputs the PWM signal to the switching power supply unit 74.

Hereinafter, the calculation of the electric current command value I* will be described that is performed by the electric current command value calculation means 72 as the electric current command value calculation unit 702. The outline of a calculation process of the electric current command value I* is as follows. That is, the electric current command value calculation means 72 sets the electric current command value I* to be larger as the torque command value T* is larger and as the amount of time change when the torque command value is increased is larger. In addition, the electric current command value calculation means 72 sets a duration of a process of calculating the electric current command value I* taking into account the amount of time change of the torque command value T* when the amount of time change of the torque command value T* is larger than a threshold value, and sets the electric current command value I* in consideration of the amount of time change of the torque command value T* when the duration is set, during the duration. Furthermore, the electric current command value calculation means 72 sets the duration based on the responsiveness relation value related to the responsiveness of the main clutch 3.

Figure 4:
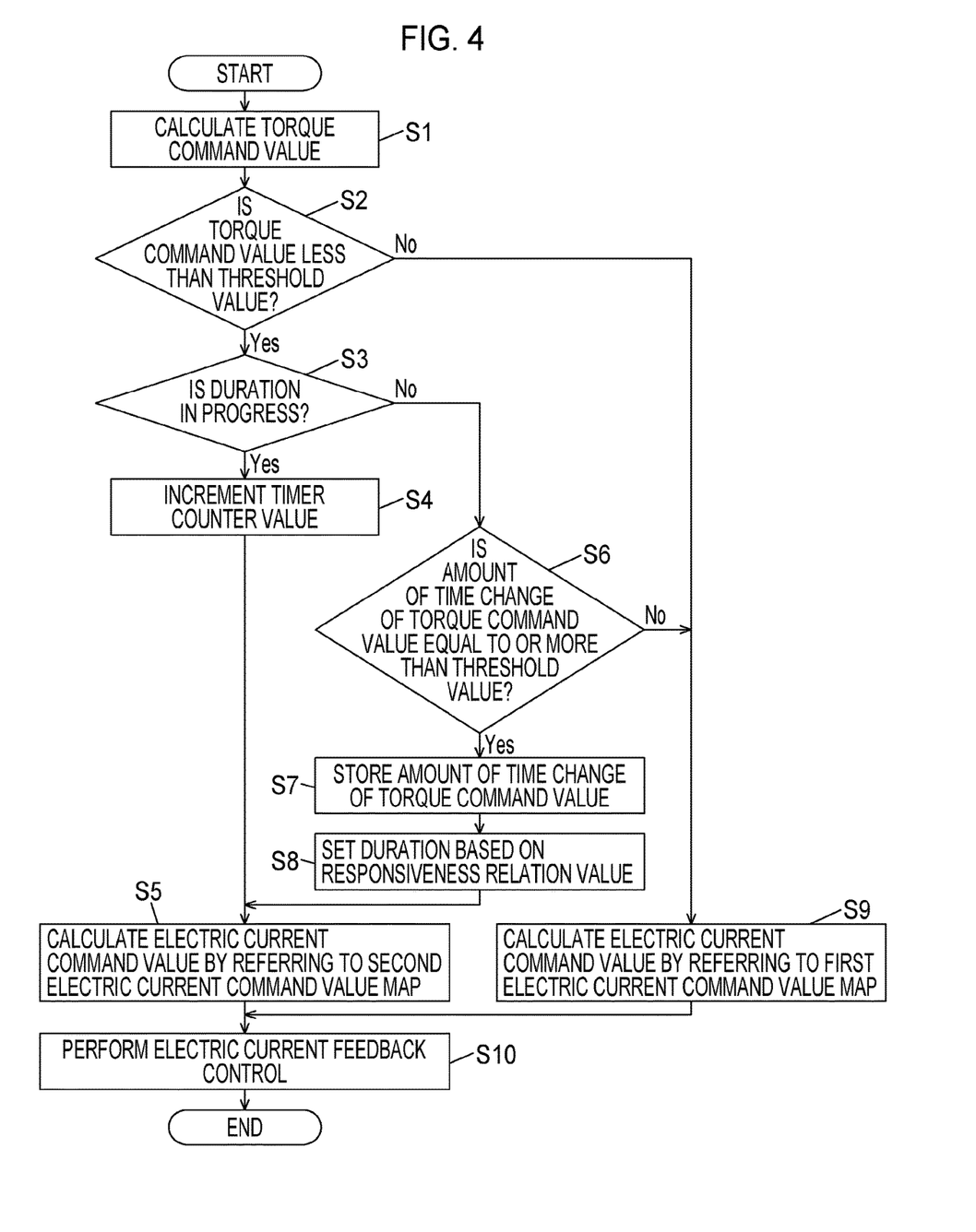
FIG. 4 is a flowchart of an example of a calculation process executed by a controller.

FIG. 4 is a flowchart showing an example of the calculation process executed by the control unit 70, centering on a process executed by the electric current command value calculation means 72. The control unit 70 repeatedly executes the process shown in the flowchart every predetermined control cycle (for example, 5 ms). In the flowchart, the operation of calculating the torque command value in step S1 is executed by the control unit 70 as the torque command value calculation means 71, and the electric current feedback control in step S10 is executed by the control unit 70 as the electric current control means 73. Operations of steps S2 to S9 are executed by the control unit 70 as the electric current command value calculation means 72.

The electric current command value calculation means 72 determines whether or not the torque command value calculated in step S1 is less than the threshold value (step S2). The operation of determination is made by taking into account the fact that, when the torque command value is large and a large electric current is supplied to the electromagnetic coil 53, the lubricating oil interposed between the main outer clutch plates 31 and the main inner clutch plates 32 is likely to be discharged and thus the problem that the responsiveness of the main clutch 3 is lowered is unlikely to occur. Therefore, the threshold value in the determination in step S2 is set to, for example, half the upper limit of the torque command value.

Next, the electric current command value calculation means 72 determines whether or not the duration has elapsed, that is, the duration is in progress, after the duration is set in step S8 to be described later (step S3). Specifically, when the determination result in step S3 is positive (Yes), determination is made as to whether or not a timer counter value, which is incremented in step S4, reaches a predetermined value set in step S8. The timer counter value is incremented for each control cycle during the duration.

When the duration is in progress (Yes in S3), the electric current command value calculation means 72 increments the timer counter value (step S4), and sets the electric current command value by referring to the second electric current command value map 722 (step S5). Further, when the duration is not in progress (No in S3), the electric current command value calculation means 72 determines whether or not the amount of time change of the torque command value is equal to or more than the threshold value (step S6).

As the amount of time change of the torque command value in the determination in step S6, the difference between the previous value of the torque command value in the previous control cycle and the current value of the torque command value in the current control cycle can be used. The total or average value of the changes in the torque command value over a plurality of control cycles may be used as the amount of time change used in the determination in step S6. The threshold value in step S6 is set such that the determination result is positive (Yes), for example, when slip occurs in one or both of the right and left front wheels 182, 181, or when the accelerator pedal 110 is suddenly depressed.

When the result of the determination in step S6 is positive (Yes), the electric current command value calculation means 72 stores the amount of time change of the torque command value used at the time of the determination (step S7) and set the duration based on the responsiveness relation value related to the responsiveness of the main clutch 3 (step S8), and further sets the electric current command value by referring to the second electric current command value map 722 (step S5). Specifically, in step S8, as a value representing the duration, a predetermined value to be compared with the timer counter value in the determination in step S3 is set. The details of the operation of step S8, and the first duration map 723 and the second duration map 724 will be described later.

Meanwhile, when the result of the determination in step S2 or the determination in step S6 is negative (No), the electric current command value calculation means 72 sets the electric current command value by referring to the first electric current command value map 721 (step S9). The electric current control means 73 performs electric current feedback control such that the electric current corresponding to the electric current command value set in step S5 and step S9 is supplied to the electromagnetic coil 53 (step S10).

Figure 5A:
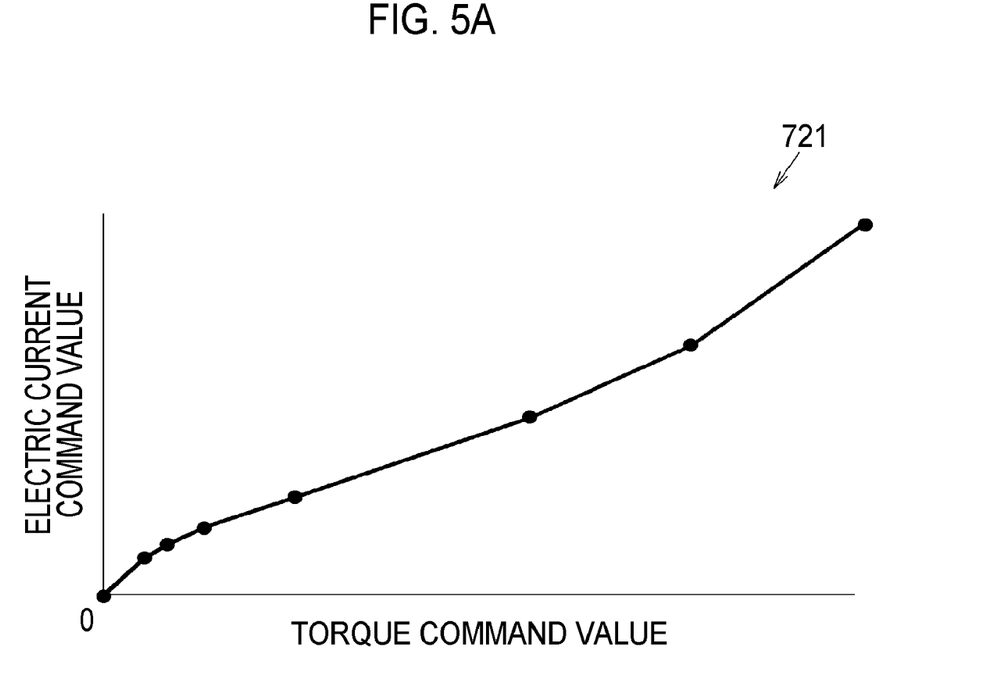
FIG. 5A is a graph showing an example of a first electric current command value map.
Figure 5B:
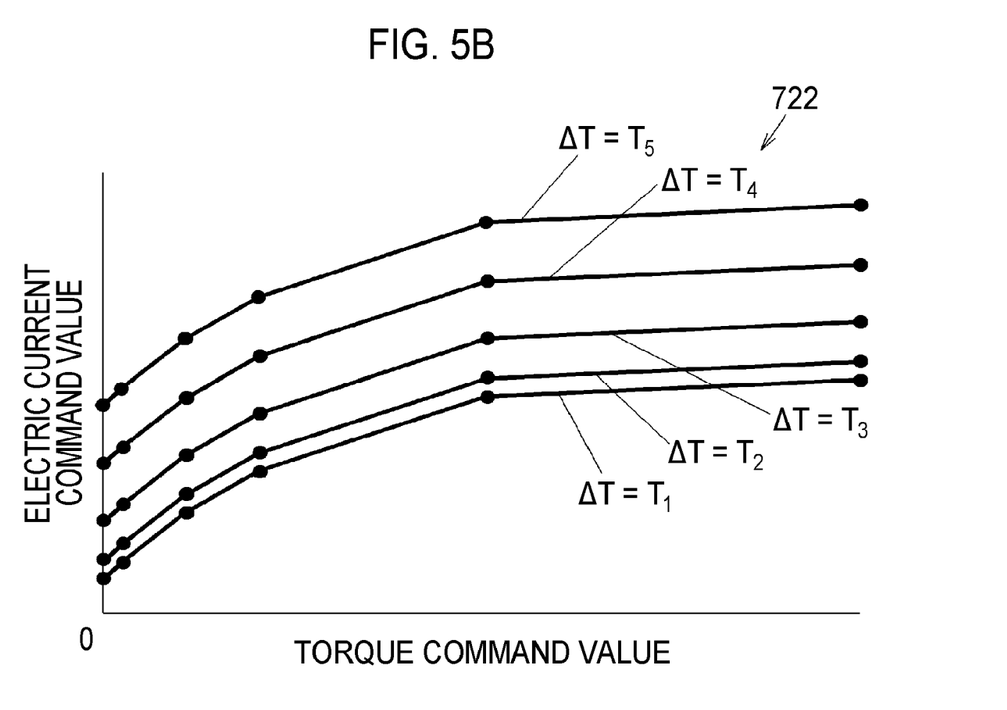
FIG. 5B is a graph showing an example of a second electric current command value map.

FIG. 5A is a graph showing an example of the first electric current command value map 721. FIG. 5B is a graph showing an example of the second electric current command value map 722. The first electric current command value map 721 shows the relationship between the torque command value and the electric current command value, and is set, for example, based on measurement results of the transmission torque when the electric current supplied to the electromagnetic coil 53 is changed from zero to the upper limit value with a constant amount of change per unit time after the assembly of the driving force transmission device 2.

In the second electric current command value map 722, the relationship between the magnitude of the torque command value and the electric current command value is defined for each amount of time change of the torque command value. In the example shown in FIG. 5B, when $\Delta T$, which is the amount of time change of the torque command value, is $T_1$ to $T_5$ (note that, $T_1 < T_2 < T_3 < T_4 < T_5$), the relationship between the magnitude of the torque command value and the electric current command value is shown for each of $T_1$ to $T_5$. The electric current command value calculation means 72 linearly interpolates the characteristic lines in each of $\Delta T = T_1$ to $T_5$ to calculate the electric current command value.

As shown in FIG. 5B, the electric current command value is set to be larger as the torque command value is larger and as the amount of time change of the torque command value is larger. In this way, when the torque command value rises stepwise and the determination in step S6 of the flowchart shown in FIG. 4 is positive (Yes), the electric current command value is small during the duration when the amount of time change is small even if the torque command value after the rise is the same.

Further, the electric current command value obtained by referring to the second electric current command value map 722 is a value larger than the electric current command value obtained by referring to the first electric current command value map 721, and during the duration after the torque command value rises stepwise, the main clutch 3 is pressed with a larger pressing force than during normal control performed by referring to the first electric current command value map 721. In this way, the lubricating oil interposed between the main outer clutch plates 31 and the main inner clutch plates 32 is quickly discharged, and the driving force (torque) transmitted by the main clutch 3 rises quickly. Further, when the amount of time change is small, the electric current command value during the duration is set to a relatively small value, and accordingly the likelihood that the control current increases excessively and more driving force than required is transmitted to the right and left rear wheels 192, 191 is reduced.

FIGS. 6A, 6B, 6C, and 6D are graphs showing examples of temporal changes in the torque command value and the electric current command value. The scales of the right and left vertical axes and horizontal axes of FIGS. 6A, 6B, 6C, and 6D are the same. In FIGS. 6A, 6B, 6C, and 6D, the electric current command value before and after the torque command value changes stepwise are shown, and Ta on the left vertical axis is the torque command value before the change, and Tb is the torque command value after the change. Further, Ia on the right vertical axis is the electric current command value before the torque command value changes, Ib is the electric current command value during the duration immediately after the torque command value rises stepwise, and Ic is the electric current command value after the duration.

In each of FIGS. 6A, 6B, 6C, and 6D, the amount of time change is represented by $\Delta T$, and the difference between the electric current command value Ic after the duration and the electric current command value Ib during the duration, that is, the increment in the electric current command value from the time of normal control to the time of using the second electric current command value map 722 is used is represented by $\Delta I$.

Figure 6A:
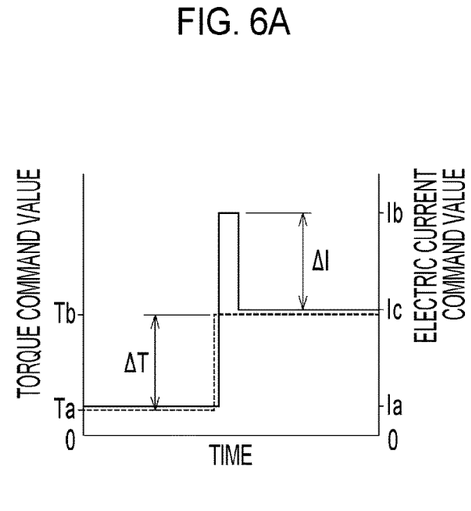
FIG. 6A is a graph showing an example of temporal changes in a torque command value and an electric current command value.
Figure 6B:
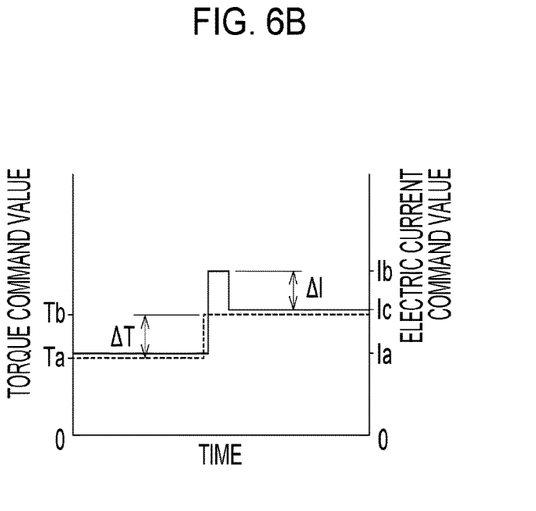
FIG. 6B is a graph showing an example of temporal changes in the torque command value and the electric current command value.

In FIGS. 6A and 6B, the torque command value Tb after the change is the same, but the torque command value Ta before the change is different, and thus the amount of time change $\Delta T$ is different. When the second electric current command value map 722 is referred to, the electric current command value is set to be larger as the amount of time change is larger, and thus, $\Delta I$ shown in FIG. 6A is larger than $\Delta I$ shown in FIG. 6B.

Figure 6C:
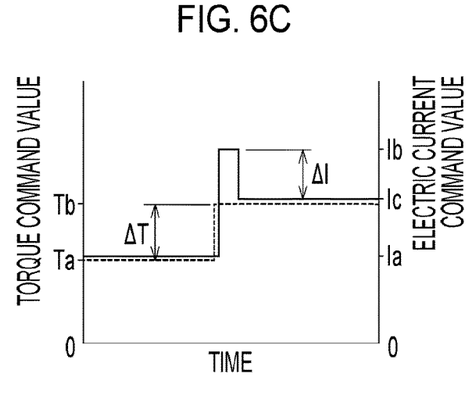
FIG. 6C is a graph showing an example of temporal changes in the torque command value and the electric current command value.
Figure 6D:
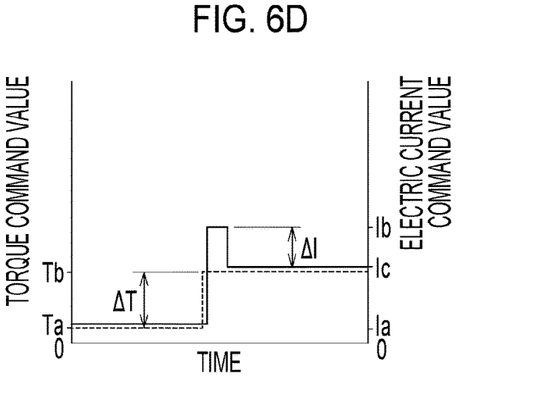
FIG. 6D is a graph showing an example of temporal changes in the torque command value and the electric current command value.

In FIGS. 6C and 6D, the amounts of time change $\Delta T$ are the same, but torque command values Ta and Tb before and after the change are different. When the second electric current command value map 722 is referred to, the electric current command value is set to be larger as the torque command value is larger. However, since when the torque command value rises, the rate of increase of the electric current command value is relatively low with respect to the rate of increase of the torque command value, the ratio (Ib/Ic) of the electric current command value (Ib) during the duration to the electric current command value (Ic) after the duration is higher in the graph of FIG. 6D in which the torque command values Ta and Tb before and after the change are relatively low. That is, when the torque command value rises stepwise from a low state, the rate of increase of the electric current command value increases.

Next, the operation of setting the duration based on the responsiveness relation value in step S8 of the flowchart shown in FIG. 4, will be described in detail. In the embodiment, a case where a relative rotation speed $\Delta N$ between the rotational speed of the housing 20 which is a rotating member on the input side and the inner shaft 23 which is a rotating member on the output side, a temperature Temp of the lubricating oil, and the load amount He of the main clutch 3 are used as the responsiveness relation value will be described. Note that, one or two of the relative rotation speed $\Delta N$, the temperature Temp of the lubricating oil, and the load amount He of the main clutch 3 may be used as the responsiveness relation value.

The relative rotation speed $\Delta N$ is, in other words, the rotational speed difference between the rotational speed of the main outer clutch plate 31 and the rotational speed of the main inner clutch plate 32. The relative rotation speed $\Delta N$ can be obtained, for example, by the difference between the average rotational speed of the right and left front wheels 182, 181 and the average rotational speed of the right and left rear wheels 192, 191. As the load amount He of the main clutch 3, for example, a value obtained by low-pass filtering the product of the relative rotation speed $\Delta N$ and the torque command value T* with a predetermined time constant can be used. The temperature Temp of the lubricating oil is an estimated value of the temperature of the lubricating oil sealed in the housing 20, and may be obtained, for example, based on the load amount He of the main clutch 3, or may be obtained by a detected value of a temperature sensor attached to the yoke 530. Further, the temperature Temp of the lubricating oil may be estimated by taking into account the outside air temperature.

The electric current command value calculation means 72 sets the duration to be longer as the relative rotation speed ΔN is lower and as the temperature Temp of the lubricating oil is lower. The reason why the duration is set to be longer as the relative rotation speed ΔN is lower is that, when the relative rotation speed ΔN is low, the lubricating oil interposed between the main outer clutch plate 31 and the main inner clutch plate 32 is unlikely to be discharged. The reason why the duration is set to be longer as the temperature Temp of the lubricating oil is lower is that, when the temperature Temp of the lubricating oil is low, the viscosity of the lubricating oil becomes high and the lubricating oil interposed between the main outer clutch plate 31 and the main inner clutch plate 32 is unlikely to be discharged.

Further, when the load amount He of the main clutch 3 is less than a predetermined value, the electric current command value calculation means 72 sets the duration to be relatively long as compared with when the load amount He of the main clutch 3 is equal to or more than the predetermined value. This is because when the load amount He of the main clutch 3 is equal to or more than the predetermined value before the torque command value T* rises, it is highly likely that the lubricating oil between the main outer clutch plate 31 and the main inner clutch plate 32 has already been discharged.

Figure 7A:
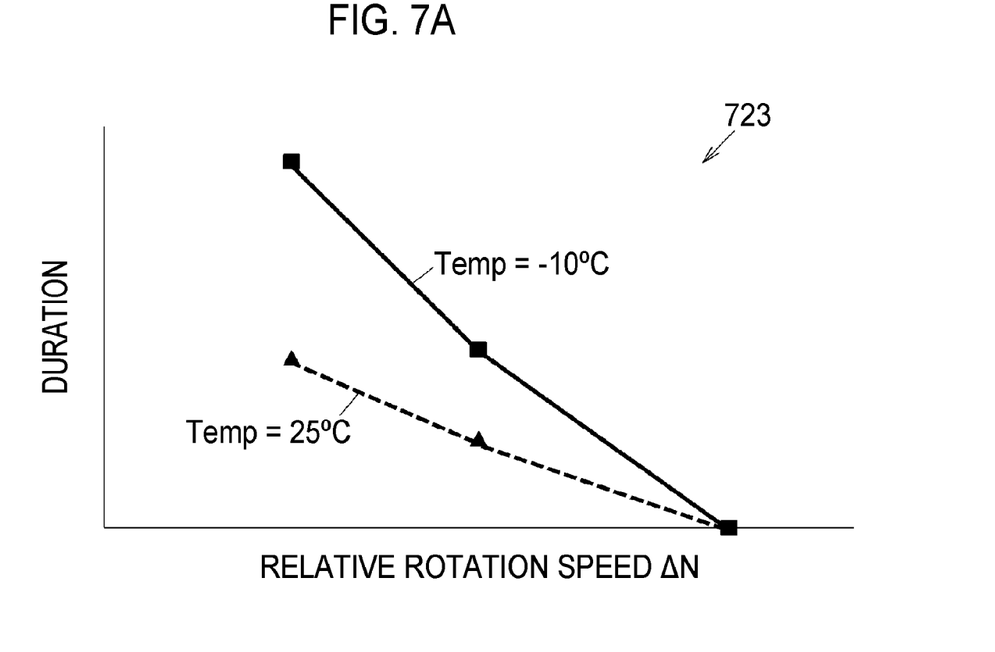
FIG. 7A is a graph showing an example of a first duration map.
Figure 7B:
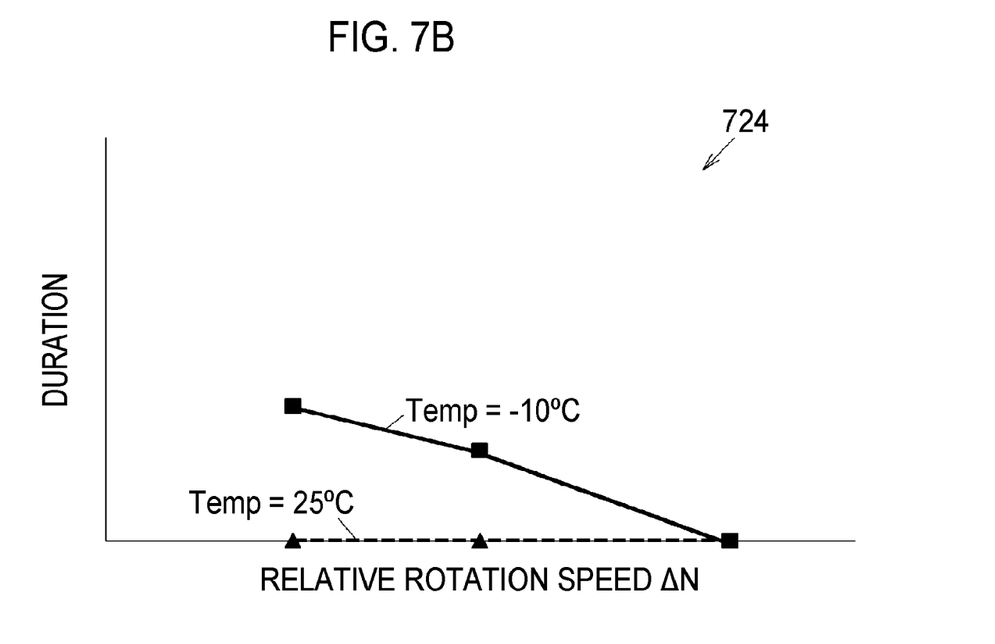
FIG. 7B is a graph showing an example of a second duration map.

FIG. 7A is a graph showing an example of the first duration map 723. FIG. 7B is a graph showing an example of the second duration map 724. The horizontal axis of the graphs represents a relative rotation speed ΔN, and the vertical axis represents the duration. Further, FIGS. 7A and 7B show a relationship between the relative rotation speed ΔN and the duration when the temperature Temp of the lubricating oil is −10° C. and 25° C. The scales of the horizontal and vertical axes of both graphs are the same.

The electric current command value calculation means 72 refers to the first duration map 723 when the load amount He of the main clutch 3 is less than a predetermined value, and refer to the second duration map 724 when the load amount He of the main clutch 3 is equal to or more than the predetermined value. As shown in FIGS. 7A and 7B, the first duration map 723 is set to have a longer duration than the second duration map 724.

The electric current command value calculation means 72 sets the duration based on the map information of −10° C. shown by the solid lines in FIGS. 7A and 7B when the temperature Temp of the lubricating oil is −10° C. or less, and sets the duration based on the map information of 25° C. shown by the broken lines in FIGS. 7A and 7B when the temperature Temp of the lubricating oil is 25° C. or higher. The electric current command value calculation means 72 sets the duration by linearly interpolating the map information of −10° C. and the map information of 25° C., when the temperature Temp of the lubricating oil is higher than −10° C. and lower than 25° C. The maximum value of the duration is, for example, several tens of ms.

Figure 8:
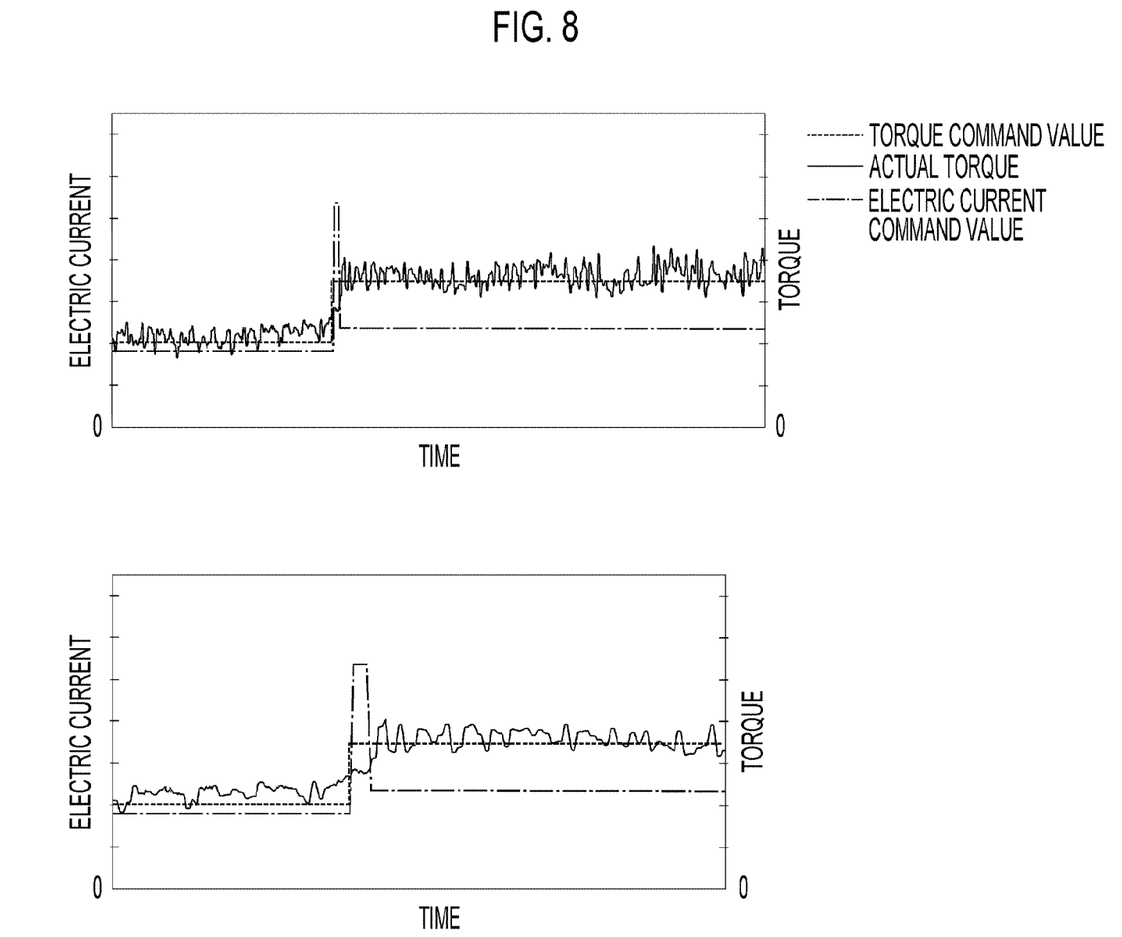
FIG. 8 shows a graph (upper figure) of an example of changes in a torque command value, an actual torque, and an electric current command value when a driving force transmission device is controlled by a control method according to the embodiment, and a graph (lower figure) of a part of the upper figure with a time axis enlarged.

The upper figure of FIG. 8 is a graph showing an example of changes in a torque command value, an actual torque transmitted from the housing 20 to the inner shaft 23, and an electric current command value when the driving force transmission device 2 is controlled by a control method according to an embodiment, before and after the torque command value rises stepwise. The lower figure of FIG. 8 is a graph showing a part of the upper figure of FIG. 8 with the time axis enlarged.

Figure 9:
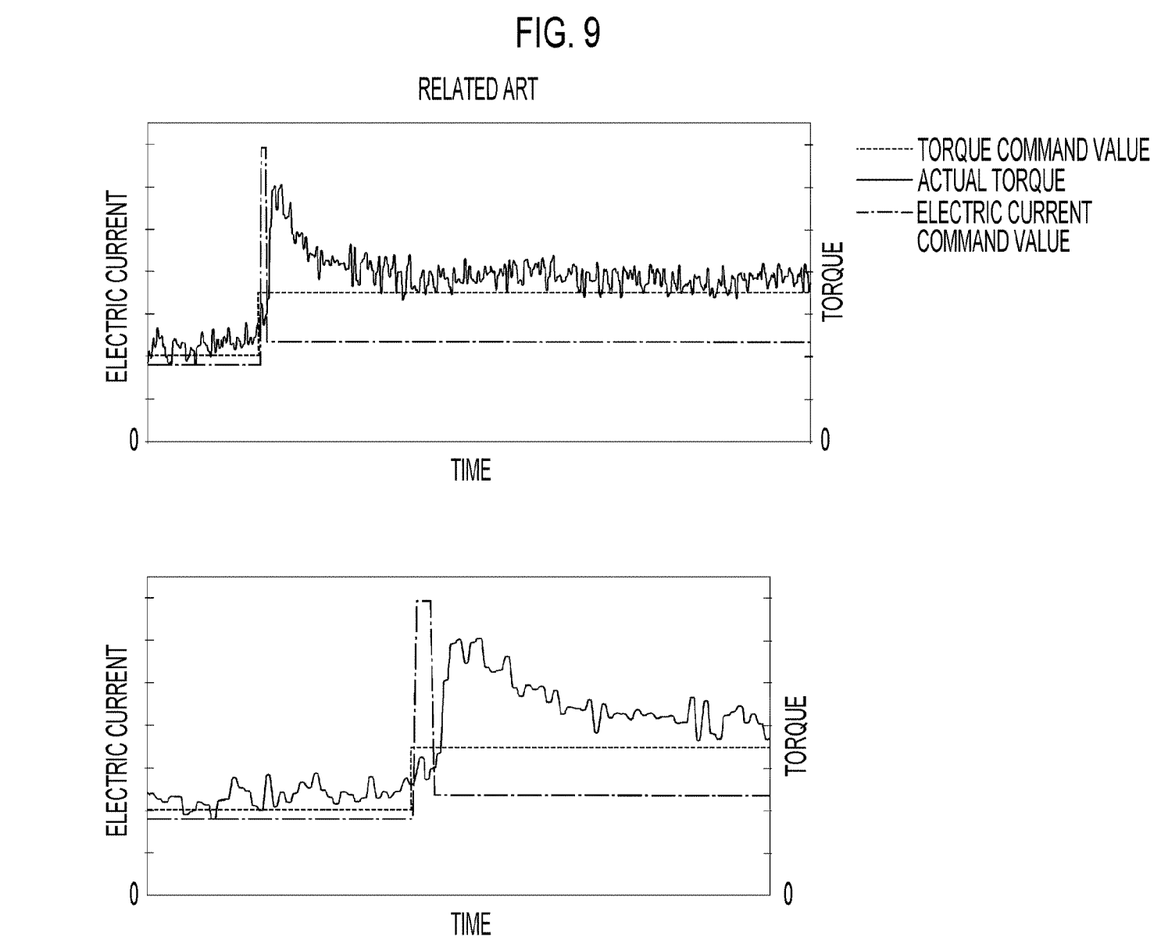
FIG. 9 shows a graph (upper figure) of an example of changes in a torque command value, an actual torque, and an electric current command value when the driving force transmission device is controlled by a control method according to the related art, and a graph (lower figure) of a part of the upper figure with a time axis enlarged.

The upper figure of FIG. 9 is a graph showing an example of changes in a torque command value, an actual torque, and an electric current command value of the related art in which an increase in the electric current command value when the torque command value rises stepwise is constant regardless of the amount of time change of the torque command value. The lower figure of FIG. 9 is a graph showing a part of the upper figure of FIG. 9 with the time axis enlarged. The scales (time scales) of the time axis of the upper figure of FIG. 8 and the upper figure of FIG. 9 and the time axis of the lower figure of FIG. 8 and the lower figure of FIG. 9 are the same.

In the related art shown in FIG. 9, the actual torque after the torque command value rises stepwise greatly exceeds the torque command value, and thus the discrepancy between the actual torque and the torque command value is large. On the other hand, when control is performed by the control method according to the embodiment, the discrepancy is suppressed.

Actions and Effects of Embodiment

As described above, according to the embodiment, the electric current command value is set according to the magnitude and the amount of time change of the torque command value, and thus the controllability of the driving force (torque) transmitted by the driving force transmission device 2 is enhanced.

Additional Remark

Although the disclosure has been described above based on the embodiment, the embodiment does not limit the disclosure according to the claims. It is to be noted that not all combinations of the features described in the embodiment are essential to means for solving the problems of the disclosure. Further, the disclosure can be appropriately modified and implemented without departing from the spirit of the disclosure.

What is claimed is:

1. A driving force transmission control device comprising:
   a driving force transmission device configured to press a friction clutch by an actuator configured to generate a pressing force with a supplied electric current, the driving force transmission device being configured to transmit a driving force of a vehicle between a rotating member on an input side and a rotating member on an output side; and
   a controller configured to control the driving force transmission device, wherein:
   the controller is configured to calculate a torque command value indicating the driving force to be transmitted from the rotating member on the input side to the rotating member on the output side based on information on the vehicle;
   the controller is configured to set an electric current command value according to a magnitude and an amount of time change of the torque command value, the electric current command value being a target value of the electric current; and
   the controller is configured to perform electric current feedback control such that an electric current corresponding to the calculated electric current command value is supplied to the actuator.

2. The driving force transmission control device according to claim 1, wherein:
   the controller is configured to set the electric current command value to be larger as the torque command value is larger; and the controller is configured to set the electric current command value to be larger as the amount of time change when the torque command value is increased is larger.

3. The driving force transmission control device according to claim 2, wherein:
the controller is configured to set a duration of a process of calculating the electric current command value taking into account the amount of time change of the torque command value when the amount of time change of the torque command value is equal to or more than a threshold value; and
the controller is configured to, during the duration, set the electric current command value taking into account the amount of time change of the torque command value when the duration is set.

4. The driving force transmission control device according to claim 3, wherein the controller is configured to set the duration based on a responsiveness relation value related to responsiveness of the friction clutch, the responsiveness relation value including at least one of a temperature of lubricating oil that lubricates the friction clutch, a relative rotation speed between the rotating member on the input side and the rotating member on the output side, and a load amount of the friction clutch.

5. A control method for a driving force transmission control device, the driving force transmission control device including a driving force transmission device configured to press a friction clutch by an actuator that generates a pressing force with a supplied electric current to transmit a driving force of a vehicle between a rotating member on an input side and a rotating member on an output side, and a controller configured to control the driving force transmission device, the control method comprising:
calculating, by the controller, a torque command value indicating the driving force to be transmitted from the rotating member on the input side to the rotating member on the output side based on information on the vehicle;
setting, by the controller, an electric current command value that is a target value of the electric current according to a magnitude and an amount of time change of the torque command value; and
performing, by the controller, electric current feedback control such that an electric current corresponding to the electric current command value is supplied to the actuator.

* * * * *